June 2, 1931. R. BRINDLE, JR 1,807,892
GRID WINDING MACHINE
Filed Feb. 9, 1929 3 Sheets-Sheet 3

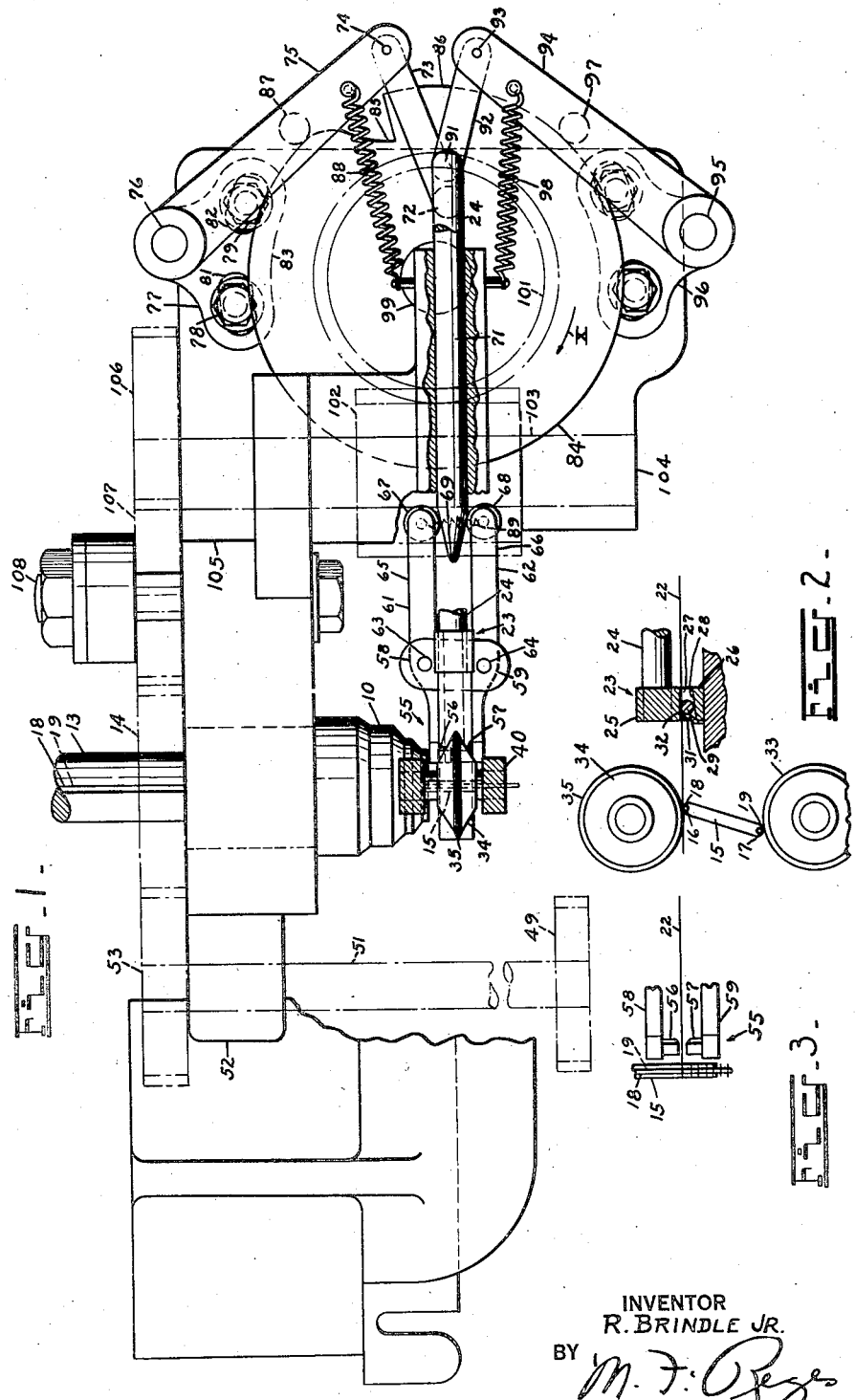

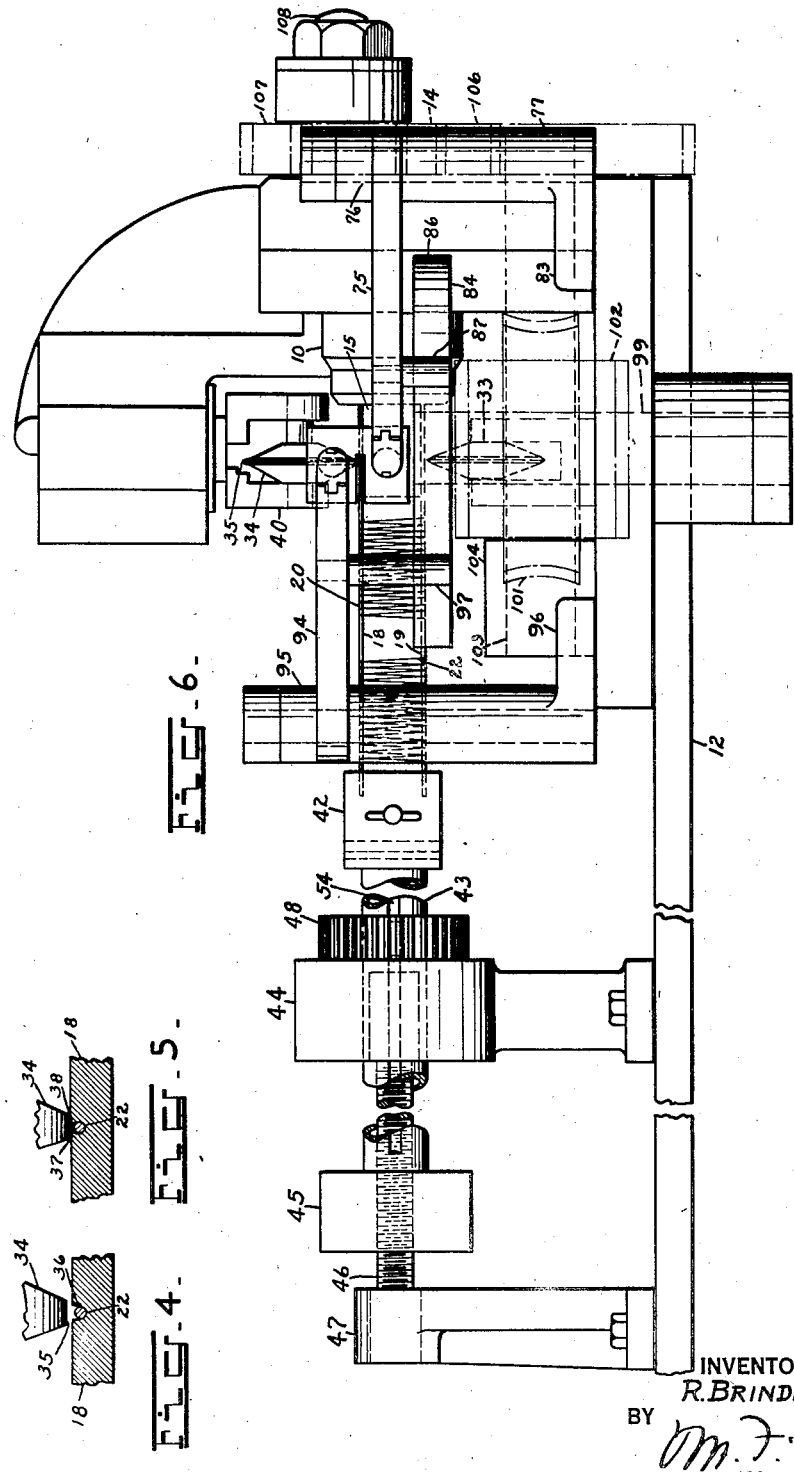

INVENTOR
R. BRINDLE JR.
BY
ATTORNEY

Patented June 2, 1931

1,807,892

UNITED STATES PATENT OFFICE

ROBERT BRINDLE, JR., OF WEST ORANGE, NEW JERSEY, ASSIGNOR TO WESTINGHOUSE LAMP COMPANY, A CORPORATION OF PENNSYLVANIA

GRID WINDING MACHINE

Application filed February 9, 1929. Serial No. 338,661.

This invention relates to the manufacture of grids as employed for electrical devices such as radio tubes or the like.

A grid structure of the character to which the present invention relates usually comprises a pair of relatively heavy wires termed, support wires, about which a relatively fine wire termed, a grid wire, is helically wound and secured by either a welding operation or by forming slots or grooves in the support wires and securing the grid wire in the slots or grooves by a beading operation.

The operation of welding the grid wire to the support wires results in what is known as a welded grid, whereas a grid produced by the operation of nicking the support wires and beading the grid wire in the nicks or slots is known as a nicked grid.

Although the present invention may be applied to either type of machine it is shown and described herein in connection with what is known as the nicked type of grid.

In producing a nicked grid the support wires are slotted transversely by means of a cutter while the support wires are supported on a mandrel and rotated therewith so that at each revolution of the mandrel a slot is cut in a support wire. The support wires are moved relative to the mandrel during the application of the grid wire thereto, so that as the grid wire is wound the rate of movement of the support wires with respect to the rate of movement of the winding operation determines the pitch of the grid wire when wound about the support wires.

Mechanism for performing this operation is clearly set forth in Patent 1,585,905 which relates to a machine for the manufacture of radiotron grids by welding, however, in the production of a nicked grid it is only necessary to provide cutting and beading members which take the place of the welding hammers.

In the manufacture of radiotron grids it is the practice to wind a continuous so-called grid strip. This strip consists of support wires having the grid wire wound therearound in helical formation and secured thereto by either welding or the nicking operation.

A grid per se as used in a radio tube is, however, relatively short and must be so formed that the helical winding of the grid wire terminates a short distance from the ends of the support wires to leave the said ends free so that they may be readily attached to other supporting structure when constituting a portion of a radio tube or other electrical device.

In producing these short grid sections a grid winding machine operates to continuously wind the grid wire about the support wires, but at intervals the welding operation or the beading operation is temporarily terminated so that a grid strip as heretofore produced consisted of a plurality of helical sections secured to the support wires, the sections being separated by a winding of grid wire free or loose upon the support wires. When the grid strip was removed from the machine and cut up into sections constituting individual grids, the loose wire was removed from each end of a grid section by the operator.

Machines operating in accordance with the above general description resulted in a considerable loss of wire as well as a loss of time on the part of the operator in removing the loose portions of wire.

With the present invention the grid wire is severed at intervals at predetermined points and instead of having the loose turns of grid wire upon the support wires, the support wires are free from grid wire at the certain portion of their length. Thus a grid strip may be made without loss of wire and when cut into sections does not require the removal of loose wire. The said helical winding may terminate a sufficient distance from the ends of the support wires to permit the said ends to be secured by welding or clamping to a supporting structure of an electrical device.

Although as above mentioned the present invention as shown and described as applied to the making of a nicked grid the invention is equally applicable to the manufacture of welded grids, an object of the invention being to provide a grid winding mechanism operable to produce a plurality of individual coiled sections.

Another object of the invention is to provide means for automatically feeding a wire for a coil winding operation.

Another object of the invention is to provide means for automatically feeding, severing and winding a wire.

Other objects and advantages of the invention will be more readily understood by reference to the following description together with the accompanying drawing in which, Fig. 1 is a plan view of a portion of a grid winding machine embodying the present invention.

Fig. 2 is a detailed view of feeding mechanism for applying a wire for a winding operation.

Fig. 3 is a fragmentary detailed view showing cutter elements for severing a wire.

Fig. 4 is an enlarged sectional view showing a portion of a wire having a groove with another wire disposed therein.

Fig. 5 is a view similar to Figure 4 but showing the edges of the groove beaded to secure a wire.

Fig. 6 is a side elevational view of the grid winding machine shown in Fig. 1 and illustrates the mechanism for rotating a winding head.

Figure 7:
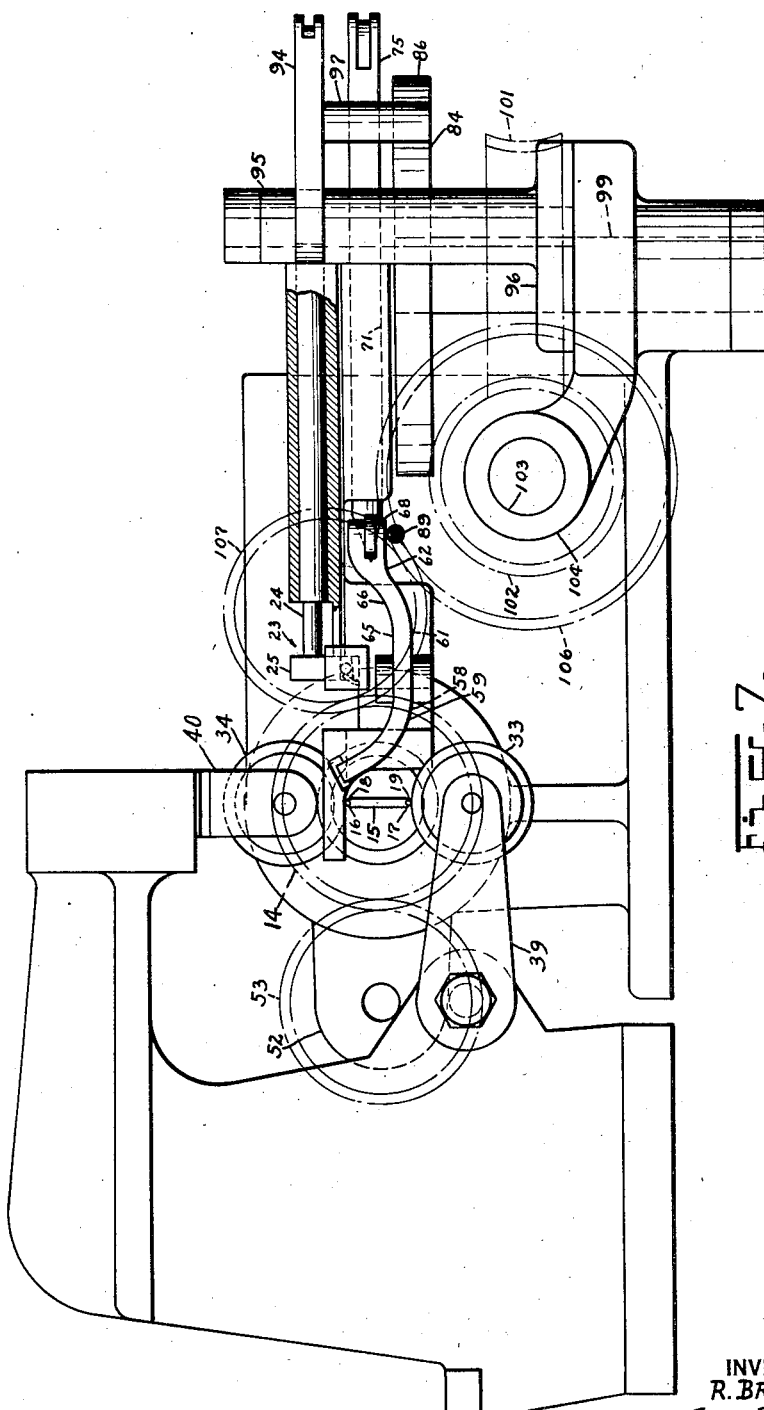
Fig. 7 is an elevational end view of the machine partly in section showing the mechanism feeding grid wire and mechanism for severing the wire.

A practical embodiment of the invention may, as shown comprise rotatable head 10 mounted in a bracket supported on a table or bed plate 12. The head is provided with shaft 13 having a gear wheel 14 secured thereto. The shaft 13 may be connected with any suitable source of power as for example a motor (not shown), which constitutes the motive force for operating the machine through the agency of other cooperating machine elements.

The head 10 is provided with a stub mandrel or arbor 15 having longitudinal grooves 16 and 17 over which support wires 18 and 19 are led from spools (not shown) or other suitable source of supply. The support wires are moved relatively to the arbor and in the direction of its axis of rotation and during this movement each support wire is nicked or grooved and since the arbor with the support wires rotate as a unit, grid wire 22 may be wound therearound and each turn, at its points of contact with the support wires, is deposited in a groove or nick and secured by a beading operation. The grid wire is fed from a suitable source of supply as from a spool (not shown) and is advanced to position in a notch by a wire feed element 23.

As shown in Fig. 2 this feed element comprises a push rod 24 having a head 25 provided with an apertured projection 26. The aperture 27 of the projecion is provided with an inclined surface 28 on which is disposed a roller 29 normally urged up the inclined surface by a spring 31. The grid wire passes between the upper surface of the roller and surface 32 of the aperture so as to be tensionally gripped between the said surface and the roller upon a forward movement of the push-rod 24. A retraction or backward movement of the rod serves to release the grid wire and permit its free movement for winding about the support wires. Mechanism for actuating the wire feeding element will presently be described.

Prior to the feeding of the grid wire to the support wires these latter wires are provided with suitably positioned slots or nicks so that a slot may be properly disposed for the reception of the grid wire and as the grid wire is applied to the slot means hereinafter described operate to compress or bead the edges of the slot over the grid wire and thus secure it. The arbor and support wires may continue to rotate and the support wires may be moved longitudinally so that the succeeding turns of grid wire will be disposed in the slots and secured by a beading operation. The nicking and beading means may, as shown in Fig. 2 comprise a knife edge disk or cutter 33 to nick or slot the support wires and a beading element or disk 34 having a relatively wide peripheral surface 35.

The cutter 33 makes a slot 36 as more clearly shown in Figs. 4 and 5 the depth of the slot is slightly greater than half the diameter of the support wire so that the surface 35 of the beading disk may compress edges 37 and 38 of the slot over the support wire.

The nicking disk is supported in a bearing bracket 39 and the beading roller is supported in a bearing bracket 40. The disks are so arranged that as the support wires are rotated the nicking and beading is performed substantially simultaneously on opposite support wires.

Mechanism for moving the support wires through given paths may comprise a clamp 42 (see Fig. 6) in which the free ends of the support wires are secured. The clamp may be integral with a hollow spindle 43 journaled in a bearing 44 and having a nut 45 secured thereto. The nut 45 threadedly engages a threaded rod or shaft 46 secured in an upright 47. The rod extends into the shaft 43 and is provided with a cylindrical enlargement for centralizing the rod within the spindle 43. A movement of the support wire is caused by a rectilinear translation of the clamp 42 and this movement is produced by means of a gear wheel 48 in mesh with a gear wheel 49 (see Fig. 1). The gear wheel 49 is secured to one end of a shaft 51 journaled in a bearing 52. The opposite end of the shaft is provided with a gear wheel 53 in mesh with gear wheel 14 thus motion is transmitted to the spindle 43.

For the purpose of causing a non-rotatable and rectilinear movement of the spindle 43 the same is provided with a feather 54 so that as the nut 45 rotates about the shaft 46 the spindle 43 is caused to travel endwise while rotating, thereby effecting a movement of the support wires over the arbor 15. The arrangement of the gear drive is such that the arbor 15 and the spindle 43 rotate in unison. The rate of rectilinear movement of the support wires in conjunction with the rate of their rotation with the arbor obviously determines the pitch of the helical winding of the grid wire about the support wires.

The mechanism above described is now employed for the making of grids and produces a grid strip equal in length to the distance traveled by the spindle 43. When the clamp 42 has moved to its limit a grid strip is produced which strip is removed by loosening the clamp and severing the support wires and grid wire adjacent to the arbor.

The grids as used in electrical devices are however relatively short and when making the grid strip means as above mentioned have heretofore been provided for leaving free or unsecured a number of turns of grid wire between sections of secured turns.

When the grid strip was removed from the machine the strip was cut into sections by severing the support wires midway between each series of secured turns of the grid wires. The free grid wire was then removed bearing short grid sections having the support wires free from grid wire a sufficient distance from the ends so as to provide space to secure the grids to supporting structure of the device in which they are incorporated.

The present invention provides means for avoiding the loose winding between the secured turns of grid wire which means comprises the hereinbefore mentioned grid wire feed-element 23 and a cutter 55 comprising a pair of blades 56 and 57 mounted on the ends of arms 58 and 59 respectively of lever-members 61 and 62. As shown in Fig. 1 the lever-members are pivoted at 63 and 64 and their opposite arms 65 and 66 are provided with rollers 67 and 68 positioned to be engaged by a reciprocal wedge 69 at one end of a slide rod 71. The opposite end of the slide-rod is pivotally connected at 72 with a link 73 which in turn is pivotally connected at 74 with a rocker arm 75.

The rocker-arm is pivoted at 76 on an adjustable bearing bracket 77. This bracket is attached to a stationary portion of the machine by tap-bolts 78 and 79 which extend through arcuate slots 81 and 82 respectively in a foot-piece 83 of the bracket. A reciprocal movement of the slide rod is effected by a cam 84 movable in the direction of arrow X.

The cam 84 is provided with a notch 85 in its surface 86 and the rocker arm 75 has a pin 87 positioned to traverse the surface 86 of the cam 84. The said pin is held in tensional engagement with the cam by spring 88. Thus as the cam rotates the pin traversing the surface 86 holds the wedge 69 from operation with the rollers 67 and 68 of the cutters, a spring 89 being provided to normally hold the cutters open. When the pin 87 reaches the notch which constitutes a drop in the cam surface the rocker member is actuated under the action of the spring 88 and the wedge 69 engages the rollers 67 and 68 causing the cutters to sever the grid wire. By reason of the adjustable bracket 77 it is obvious that the stroke or movement of the slide rod may be varied. The cam 84 may be so positioned and timed that the cutters are operated after a given number of turns of grid wire have been secured to the support wires.

After the grid wire has been severed the support wires are permitted to move a given distance to allow for a blank space on the support wires, i. e., the support wires have no grid wire wound thereon for a given distance. This is accomplished by delaying the action of the wire feeding mechanism. This mechanism may comprise substantially the same operating elements as those described for actuating the cutters. As shown the push-rod 24 is pivotally connected at 91 with a link 92 which link is pivotally connected at 93 with a rocker-arm 94.

This arm is pivoted at 95 on a bearing bracket 96 which bracket is adjustably attached to the machine in the same manner as the bracket 77. The rocker arm 94 is provided with a pin 97 held against the cam surface 86 by a spring 98. Thus when the pin 97 travels over surface 86 the head 25 of the push rod 24 will be in its retracted position ready to grip the grid wire and feed it to the support wire. Therefore when the pin 97 drops into notch 85 the roller 29 is actuated to press the grid wire against the surface 32 and the end of the wire is inserted into a notch or nick 36 on the support wire. The mechanism may be so arranged that the end of the grid wire enters a nick just prior to the movement of the support wire under the beading roller or disk 34 which secures the end of the grid wire to the support wire. A continued operation of the machine causes the succeeding turns of the grid wire to enter the notches produced by the disk 33 and become secured by the beading disk. The cam 84 is so proportioned that the proper number of secured turns are wound on the support wire before the operation of cutting and feeding is repeated.

The cam 84 is secured to a vertical shaft 99 upon which a worm wheel 101 is secured, the worm wheel being disposed in mesh with a worm 102 secured to a shaft 103 journaled in bearings 104 and 105. The shaft 103 is provided with a gear wheel 106 disposed in mesh with an idler or change gear 107 rotatable on a stub shaft 108 and in mesh with gear wheel 14 on the main drive shaft 13. Motion is thus transmitted to the cam 84 and by reason of the gear train 106,107 and 14. The rate of speed of the cam 84 with relation to the movement of the support wires may be varied since by varying the diameters of the gears the peripheral speed of the cam may be changed to vary the space between the wound sections of grid wire.

From the foregoing it will be evident that the present machine operates to produce a plurality of helically wound sections of wire in spaced relation on a length of support wire constituting a grid strip 20. The grid strip 20 may therefore be readily cut into sections by severing the grid wires midway between the helical winding of severed wire. Thus no waste occurs and the time and labor of removing loose wire is aliminated.

Although a preferred embodiment of the invention is shown and described herein it is to be understood that modifications may be therein without departing from the spirit and scope of the invention as set forth in the appended claims.

What is claimed is:

1. A machine for making grids comprising means for holding a support wire, means for winding a series of turns of a grid wire around said support wire, means for securing said turns to said support wire; means for terminating the winding operation, means for winding another series of turns about said support means for actuating said third mentioned means to secure said last mentioned turns to said support wire.

2. A machine for making grids comprising means for holding a support wire, means for winding a series of turns of a grid wire around said support wire, means for securing said turns to said support wire; means for severing said grid wire, means for winding another series of turns about said support wire and means for actuating said third mentioned means to secure said last mentioned series of turns to said support wire.

3. A machine for making grids comprising means for holding support wires, means for notching said support wires, means for winding a grid wire into a helix of a given number of turns about said support wires and disposed in said notches, means for closing the notches to secure said turns of grid wire, means for severing said grid wire and means for winding another helix on said support wires with the turns disposed in said notches, said means for closing the notches being operable to secure said last mentioned helix to said support wires.

4. A machine for making grids comprising means for holding support wires, means for feeding grid wire, means for helically winding a series of turns of said grid wire about said support wires, means for severing said grid wire means for changing the relative position of said wound wire and the wire feeding means, and means for helically winding another series of turns about said support wires.

5. A machine for making grids comprising means for holding a support wire, means for winding a series of turns of a grid wire about said support wire, grid wire securing means, means for severing said grid wire, means for moving said support wire in the direction of its longitudinal axis, means for winding another series of turns about said support wire and means for actuating said grid wire securing means.

6. A machine for making grids comprising a rotatable arbor for support wires, means for moving support wires over said arbor, means for winding a series of turns of a grid wire around said support wires, means for severing said grid wire and means for winding another series of turns of said grid wire about said support wires.

7. A machine for making grids comprising a rotatable arbor, means for moving a support wire over said arbor, means for winding a series of turns of a grid wire about said support wire, means for severing said grid wire and means for winding another series of turns of said grid wire about said support wire.

8. A machine for making grids comprising means for holding support wires, means for moving said support wires, means for winding a grid wire around said support wires to produce a helix having a predetermined number of turns, grid wire securing means, means for severing said grid wire, means for winding another helix having a given number of turns around said support wires and means for actuating said grid wire securing means.

9. A machine for making grids comprising means for holding support wires, grid wire feeding means, means for winding a series of turns of a grid wire about said support wires, means for severing said grid wire, grid wire securing means, means for changing the relative positions of said support wires and said grid wire feeding means, means for winding another series of turns of said grid wire around said support wires, said grid wire securing means being operable to secure said last mentioned turns to said support wires.

10. A machine for making grids comprising means for holding support wires, grid wire feeding means, means for winding a series of turns of grid wire around said support wires, grid wire securing means, means for severing said grid wire, means for winding another series of turns of grid wire on said support wires in spaced relation to said first mentioned series of turns, said grid wire securing means being operable to secure said last mentioned turns to said support wires.

In testimony whereof, I have hereunto subscribed my name this 25th day of January, 1929.

ROBERT BRINDLE, Jr.